US012209438B2

(12) United States Patent
Diez Estevez et al.

(10) Patent No.: US 12,209,438 B2
(45) Date of Patent: Jan. 28, 2025

(54) OPENING CONTROL DEVICE WITH REVERSIBLE AND IRREVERSIBLE INERTIAL SAFETY LOCKING

(71) Applicant: AKWEL VIGO SPAIN S.L, Vigo Pontevedra (ES)

(72) Inventors: Alberto Diez Estevez, Pontevedra (ES); Delmiro Javier Couto Maquieira, Pontevedra (ES); José Oscar Vazquez Carballo, Vigo (ES); Julio Garcia Rodriguez, Pontevedra (ES)

(73) Assignee: AKWEL VIGO SPAIN S.L, Vigo Pontevedra (ES)

( * ) Notice: Subject to any disclaimer, the term of this patent is extended or adjusted under 35 U.S.C. 154(b) by 13 days.

(21) Appl. No.: 17/379,313

(22) Filed: Jul. 19, 2021

(65) Prior Publication Data

US 2022/0034127 A1 Feb. 3, 2022

(30) Foreign Application Priority Data

Jul. 29, 2020 (FR) .................................... 2008031

(51) Int. Cl.
*E05B 77/06* (2014.01)
*E05B 85/10* (2014.01)

(52) U.S. Cl.
CPC .............. *E05B 77/06* (2013.01); *E05B 85/10* (2013.01)

(58) Field of Classification Search
CPC .......... E05B 77/04; E05B 77/06; E05B 85/10; E05B 77/12

(Continued)

(56) References Cited

U.S. PATENT DOCUMENTS 8,366,159 B2 * 2/2013 Patel ........................ E05B 77/06 292/336.3
8,511,726 B2 * 8/2013 Lennhoff ................ E05B 85/16 292/336.3

(Continued)

FOREIGN PATENT DOCUMENTS

CN 108843158 A * 11/2018 ............. E05B 77/06
EP 2942461 A1 11/2015

(Continued)

OTHER PUBLICATIONS

Apr. 14, 2021 Search Report issued in French Patent Application No. 2008031.

*Primary Examiner* — Eugene G Byrd
*Assistant Examiner* — James Edward Ignaczewski
(74) *Attorney, Agent, or Firm* — Oliff PLC

(57) ABSTRACT

This device includes a base, a handle lever mounted so as to pivot on the base about an axis, a kinematic chain configured to transmit a movement of the handle lever to a lock of the opening control to unlock the door, an inertial safety member having a main body forming an inertial mass and a main locking element connected to the body and configured to pass, by inertia effect in the event of impact, from an inactive idle position to at least one active position of locking at least one movable element of the kinematic chain. The inertial member is movably mounted so as to pivot on the base about a second locking axis and is configured to operate in a reversible mode by adopting at least one reversible locking position and to operate in an irreversible mode by adopting at least one irreversible locking position.

19 Claims, 14 Drawing Sheets

(58) Field of Classification Search
USPC ........................................................ 292/336.3
See application file for complete search history.

(56) References Cited

U.S. PATENT DOCUMENTS

| | | | | |
|---|---|---|---|---|
| 9,435,146 | B2 * | 9/2016 | Müller .................... | E05B 77/06 |
| 9,637,956 | B2 * | 5/2017 | Niegeloh ................ | E05B 85/16 |
| 2002/0059693 | A1 * | 5/2002 | Jooss ...................... | E05B 77/06<br>16/412 |
| 2012/0061162 | A1 * | 3/2012 | Savant .................... | E05B 77/06<br>180/274 |
| 2017/0030116 | A1 | 2/2017 | Ilardo et al. | |
| 2019/0301213 | A1 * | 10/2019 | Casal Gomez ....... | E05B 85/107 |

FOREIGN PATENT DOCUMENTS

| | | | |
|---|---|---|---|
| EP | 3584395 | A1 | 12/2019 |
| FR | 3084390 | A1 | 1/2020 |
| WO | 2010/133372 | A1 | 11/2010 |

* cited by examiner

OPENING CONTROL DEVICE WITH REVERSIBLE AND IRREVERSIBLE INERTIAL SAFETY LOCKING

The present invention relates to a safety device for a control for opening a door such as a door of a motor vehicle. More specifically, but not exclusively, the invention applies particularly to the field of protecting a motor vehicle with respect to an impact caused by an accident.

Handles for a vehicle door are known, provided with a safety device making it possible, in the event of an accident, to prevent the opening of the door under the effect of deceleration suffered by the grippable part of the handle.

Generally, a door, for example a door of a vehicle, is closed by means of a lock comprising a bolt secured to the door suitable for engaging with a keeper secured to the bodywork. When opening is performed from outside the vehicle, the bolt is disengaged from the keeper actuating a system known by the generic name "external opening control" or also known by the abbreviation "EOC". Such a system comprises a handle which, when it is pulled by a user, causes the lock to be released.

The action exerted on the handle results, through a kinematic chain of the EOC, in the disengagement of the bolt from the keeper and therefore the opening of the door. When the user releases the handle, it is returned to the idle position by a return spring.

In the absence of any safety device, it will be understood that, when there is a side impact, the inertial force related to the mass of the handle may reach, or even exceed, the tensile force normally necessary for opening the door. This is because a side impact is capable of developing instantaneous accelerations of great intensities on the handle. The intensity of the inertial forces generated may therefore be considerable, even with lightened handles.

Moreover, the stiffness of the return spring of the handle is of course very insufficient for opposing the opening force exerted by the inertial force applied to the handle.

In order to comply with current safety standards, in particular in the case of side impact, the lateral handles of the motor vehicle currently known are equipped with an inertial safety device. This inertial safety device is triggered in the event of side impact on the door and blocks the opening control in order to prevent any unwanted opening of the side door that could cause an ejection of the passenger out of the vehicle.

As is known per se, an inertial safety device is composed of an inertial mass and a locking lug or finger secured to the inertial mass, which cooperates with a movable element of the kinematic transmission chain, generally the transmission or return lever. When there is a side impact, the locking finger cooperates with said return lever to lock it in a position preventing unlocking of the lock.

Generally, the known inertial safety devices lock the return lever either reversibly or irreversibly.

In particular, from the prior art, in particular from the document EP 2 432 954 A1, an inertial safety system is known, including two inertial masses, mounted pivotably between an idle position and an active position preventing the rotation of the transmission lever, a first of the masses operating reversibly, the second of the masses operating irreversibly.

Such an inertial system makes it possible to prevent any unwanted opening of the door in the event of impact both for low accelerations and for higher accelerations. The drawback of such an inertial system, although very effective, is that it is particularly bulky, is not economical and furthermore has a not insignificant negative impact on the weight of the inertial safety system.

The present invention aims to overcome the drawbacks of the prior art by proposing an opening control with an optimized inertial safety system overcoming the aforementioned defects and drawbacks.

For this purpose, the object of the invention is in particular a device for controlling the opening of a motor vehicle door, comprising:

- a base configured for receiving the opening control,
- a handle lever configured for being mounted so as to pivot on the base about a first handle axis,
- a kinematic chain configured for transmitting a movement of the handle lever to a lock of the opening control to unlock the door,
- an inertial safety member comprising a main body forming an inertial mass and a main locking element connected to the body and configured to pass, by inertia effect in the event of impact, from an inactive idle position to at least one active position of locking at least one movable element of the kinematic chain, characterized in that the inertial member is mounted so as to be able to move pivotably on the base about a second locking axis and is configured for operating in a reversible mode by adopting at least one reversible locking position in a first angular pivoting range and for operating in an irreversible mode by adopting at least one irreversible locking position in a second angular pivoting range, and in that the locking element is provided with a locking surface configured for, in the event of impact, intercepting the movable element during its path within the limit of a first region of the locking surface in the reversible mode and at least partially in the second region of the locking surface in the irreversible mode, separate from the first region.

The control device according to the invention combines the advantage of the small size and low weight of a conventional inertial system operating only in a single irreversible or reversible mode with the performances of an inertial system operating both in the two reversible and irreversible modes. This effect is obtained for example by defining a spatial angular offset of two regions of a locking surface of the inertial member that are different according to the reversible locking position in the first angular pivoting range or the irreversible locking position in the second angular range of the inertial member. In other words, the locking surface of the inertial member intercepts the movable element of the kinematic chain in two regions offset spatially from each other, this spatial offset being caused by the various angular pivoting ranges of the inertial member respectively in the reversible and irreversible modes.

A control device according to the invention may further comprise one or more of the following features.

In a preferred embodiment of the invention, the locking element is provided with a locking surface configured for, in the event of impact, intercepting the movable element during the travel thereof within the limit of a first region of the locking surface in the reversible mode and at least partially in a second region of the locking surface in the irreversible mode, separate from the first region.

In the preferred embodiment of the invention, the passage from the reversible mode to the irreversible mode is implemented by passing, without return by the inertial member, during pivoting thereof in the event of impact, a tongue, deformable under bending, mounted on the base.

In the preferred embodiment of the invention, the movable element comprises a secondary arm of the handle lever or a return member mounted so as to be able to pivot with respect to the base about a third rotation axis.

In the preferred embodiment of the invention, the handle lever being able to adopt a flush position wherein the handle lever is completely or partially housed in the base and an ejected position wherein the handle lever extends at least partly out of the base, the secondary arm is provided at its free end with a shape preventing the inertial member from adopting the irreversible mode when the handle lever is in the ejected position.

In another preferred embodiment of the invention, said shape of the secondary arm defines a profile with a locking nose delimiting first and second positioning notches configured for cooperating respectively in the flush position with the locking surface of the locking element and in the ejected position with a wedge-shaped ridge of the locking element.

In another embodiment of the invention, the second notch is provided with a radial stop surface locking the rotation of the inertial member in the reversible mode.

In another embodiment of the invention, the safety member comprises at least one secondary locking element, the main locking element cooperating with the secondary arm and the secondary locking element cooperating with a return member mounted so as to be able to pivot with respect to the base about a third rotation axis, the two locking elements being spaced apart angularly from each other.

In another embodiment of the invention, the spatial delimitation of the first and second regions of the locking surface is defined with respect to an angular offset caused by a positioning lug of the inertial member on either side of the tongue.

In another embodiment of the invention, wherein the lug comprises an internal rim of material forming a positioning strut above the tongue in the irreversible mode and an exterior positioning flat below the tongue in the reversible mode.

In another embodiment of the invention, the main body of the safety member comprises a frontal attachment face and an opposite dorsal face extending substantially parallel to the locker axis, the frontal attachment face comprises an upper edge in the form of an attachment rim forming the lug.

In another embodiment of the invention, the main body of the safety member comprises a frontal attachment face and an opposite dorsal face extending substantially parallel to the locker axis, the frontal face also comprises a bottom edge forming an angular end-of-travel stop of the inertial member in the irreversible mode.

In another embodiment of the invention, the tongue is configured to allow passing of the inertial member in a pivoting direction and to prevent passing in the opposite direction.

In another embodiment of the invention, the base comprises a profiled member forming a support sole plate on which the tongue is mounted, the tongue rests partially on the sole plate and is extended freely by one end so that the support sole plate substantially opposes the bending thereof in one direction while allowing bending in the opposite direction by detachment of the tongue from the support sole plate.

In another embodiment of the invention, the locking surface circumferentially extends substantially in an arc of a circle, the center of curvature of the arc being offset with respect to the locker axis in order to generate, in the event of pressing exerted on the locking surface by the movable element, a rotational torque of the inertial member in the direction of locking of the inertial member.

In another embodiment of the invention, the inertial member has global symmetry of design along a midplane orthogonal to the locker axis.

In another embodiment of the invention, the dorsal face of the inertial member comprises a rocker foot against which the secondary arm comes to abut to urge the inertial member in a rocking movement during a normal opening operation of the handle lever.

In another embodiment of the invention, the locking element extends radially from the locker axis, forming a finger provided at the end thereof with said locking surface.

In a preferred embodiment of the invention, the lever comprises a main gripping arm and a secondary arm extending the main arm each located on either side of the handle axis, said chain comprising at least one active arm of the handle lever formed by the secondary arm.

Other features and advantages of the invention will emerge in the light of the following description, made with reference to the accompanying drawings, wherein.

Figure 1:
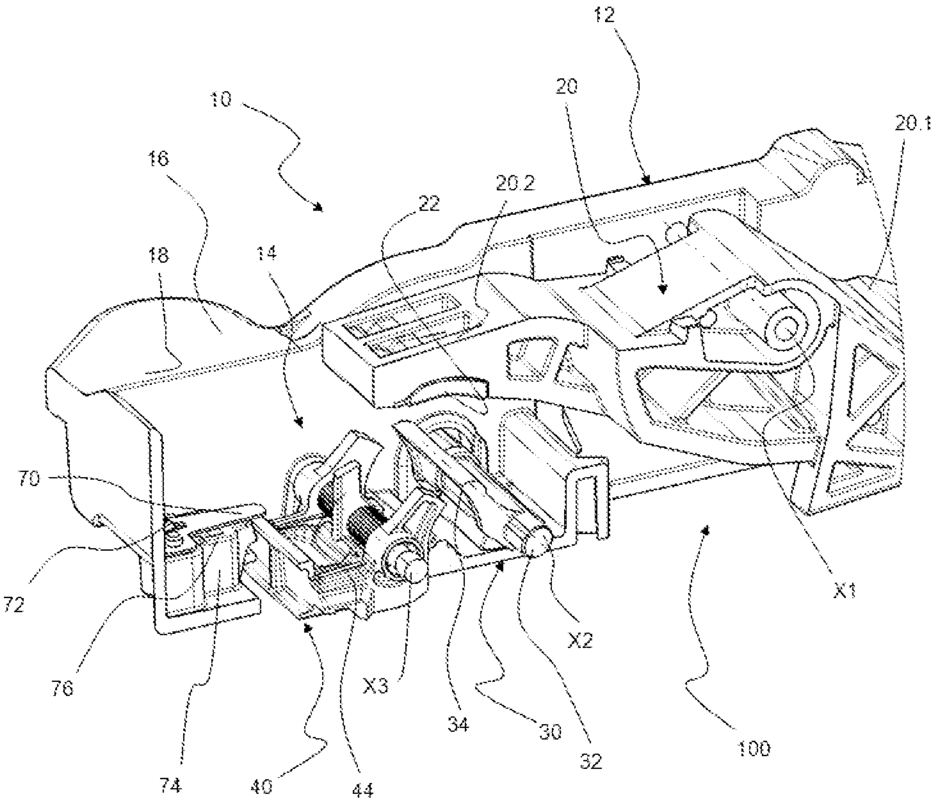
FIG. 1 shows a view in cut-away perspective of a device controlling the opening of a motor vehicle door according to a first embodiment of the invention at rest.

As a preliminary, it should be noted that certain terms used in the present description such as “downstream”, “upstream”, “left”, “right”, “interior”, “exterior” are used to facilitate the description of preferred embodiments of the invention. These terms are not intended to limit the position wherein the components of the invention can be used. This is because it is envisaged that the components of the invention can be easily positioned in any orientation required for use.

FIGS. 1 to 12 show schematically a device for controlling opening of a motor vehicle door according to a first embodiment of the invention. The opening control is designated by the general reference 10.

The opening control 10 is designed to be mounted on an external bodywork panel (not shown) of a door, which is for example a vehicle side door. The opening control 10 includes mainly a fixed handle support 12, also designated as an attachment base, pedestal or bracket according to the type of design of the handle, and a handle system 14 according to the invention.

In service, the support 12 is intended to be attached to the door. In the example illustrated, the support 12 comprises a housing 16. The housing 16 is for example roughly parallelepipedal in shape and is adapted for being housed in a cutout or recess of the external panel of the door. The housing 16 is moreover preferably open on its external face side and closed by a bottom of the internal side in order to delimit an enclosure 18 intended to house the handle system 14.

The handle system 14 comprises a handle lever 20 configured for being mounted so as to pivot about a pivot axis X1 on the support 12 of the opening control 10. The handle lever 20 is in the example described mounted so as to be articulated with respect to the panel, about the geometric handle axis X1, on the support 12. The handle axis X1 is here substantially vertical and parallel to the general plane of the external panel.

In the example described, the handle system 14 is of the flush type, i.e. the support 12 on which the handle system 14 is movably mounted forms a cavity (shown partially) able to completely receive the handle system 14 in the retracted configuration. In this configuration, the external surface of the handle lever 20 fits flush with the external surface of the external wall of the door. In the emerged or deployed configuration, the handle lever 20 at least partially emerges from the cavity of the support 12 so as to be able to be gripped by a user of the vehicle with a view to opening the door. To do this, the user can move the handle lever 20 further towards the outside in order to control the door lock with a view to opening thereof.

Thus, in the example described, the handle lever 20 being able to adopt a flush position wherein the handle lever 20 is almost completely housed inside the enclosure 18 of the base 12 and an ejected position wherein the handle lever 20 at least partially extends out of the base 12.

It is however understood that other movable assemblies can be envisaged, such as in particular by pivoting on an axis located at another position or in translation in a direction essentially perpendicular to the midplane of the door. It should also be noted that the movable mounting of the handle lever with respect to the support is known per se to a person skilled in the art.

The lever 20 is in particular configured for gripping by a user. For this purpose, the lever 20 has an external portion 20.1, or main gripping arm, that the user can grip. Opposite the external portion 20.1, the lever 20 has an internal portion 20.2 that forms a secondary internal extension arm 20.2 of the main arm 20.1, which is preferably intended to extend so as to be invisible from the outside of the bodywork. Conventionally, on the external portion 20.1, the lever 20 includes for example a gripping blade 22, which has overall a flat and elongate shape.

The main arm 20.1 and the secondary 20.2 are each located on either side of the handle axis X1 of the lever 20. Furthermore, the lever 20 comprises a center of gravity preferably located on the same side as the main arm 20.1. Preferably, the center of gravity of the lever 20 is offset from the handle axis X1.

Figure 2:
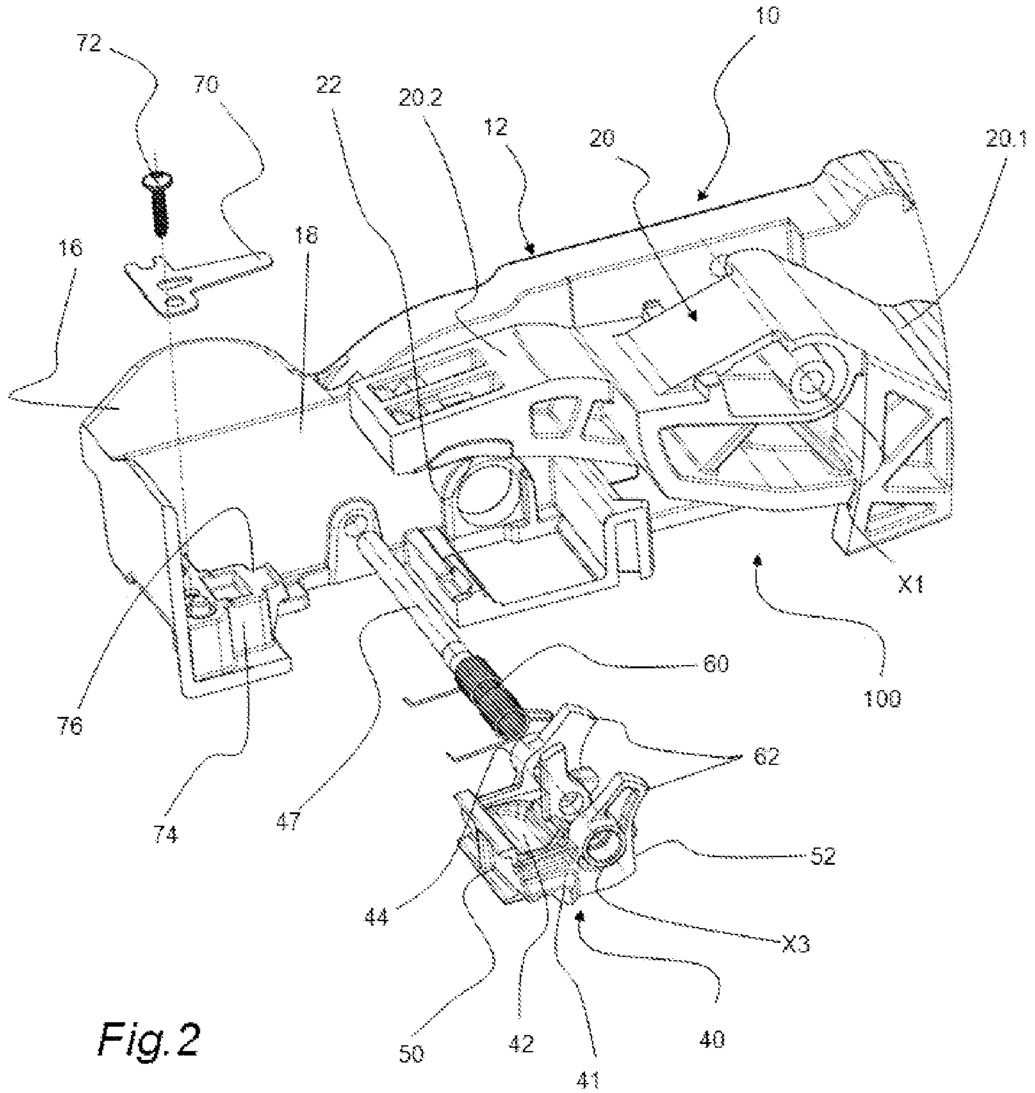
FIG. 2 shows a view in exploded cut-away perspective of the device of FIG. 1.

As can be seen in FIG. 1 or 2, the base 12 is in the general form of a housing 16 having an enclosure 18 inside which the lever 20 is intended to be housed. The lever 20 is preferably able to move in rotation with respect to the housing 16. For this purpose, the opening control 10 comprises an articulation about which the lever 20 is rotationally articulated about the handle axis X1.

This opening control 10 is intended to cooperate with a lock (not shown) of the motor vehicle door able to adopt a locked configuration and an unlocked configuration. Conventionally, the pivoting of the lever 20 of the handle system 14 about the articulation axis X1 thereof actuates the lock (not shown in the figures) in one or other of the two locked or unlocked configurations thereof by means of a driving kinematic chain 100.

As is known per se, the kinematic chain 100 is configured for transmitting a movement of the handle lever 20 towards a lock of the opening control 10 to unlock the door. More precisely, in the example described, said chain 100 comprises at least one actuation arm or active arm 20.2 of the handle lever 20. This actuation arm 20.2 forms an active part of the handle lever 20 that through its movement will drive the other elements of the chain 100 as far as the lock mechanism of the opening control 10.

This is because, conventionally, the handle lever 20 is configured for actuating the driving kinematic chain 100 to unlock the door. In this first embodiment, the actuation arm or active arm is formed by the secondary arm 20.2 of the handle lever 20, which is able to be kinematically coupled to a return lever 30 forming another movable element of the kinematic chain 100. In this example, as illustrated in FIG. 1, the return lever 30 is mounted so as to pivot about a return axis X2 parallel to the handle axis X1 in the base 12. A torsion spring mounted around the return axis X2 returns for example the return lever 30 to the idle locking position.

Moreover, in the example described, the handle 20 and the return lever 30 are not in contact with each other when the handle 20 is in its closure position.

In normal operating mode, when a user actuates the handle lever 20 by gripping the main arm 20.1, i.e. by pivoting it about its handle axis X1 in the direction of opening of the handle 20, the active handle part 30 formed by the secondary arm 20.2 is arranged to rotate the return lever 30 and to pivot it about its return axis X2. The pivoting of the return lever 30 into an unlocking position then disengages the lock and allows opening of the door.

For this purpose, for example and as is known per se, the return lever 30 comprises a rotary cage (not illustrated) delimiting an internal cavity with a roughly cylindrical shape inside which a hub body extends centrally. The return lever 30 also comprises for example a pedestal extending at the periphery of the cage and comprising means for connecting the return lever 30 to elements driving the lock (not shown) such as for example linkage elements or a Bowden cable.

In the example described, the base 20 also comprises a shaft 32 for rotating the return lever 30 extending along the axis X2.

Furthermore, preferably, the opening control 10 also comprises an elastic return member (not illustrated) mounted for example inside the cage of the return lever 30 to return the return lever 30 to the idle position. The return member comprises for example a helical torsion spring of the return lever 30 mounted around the rotation axis X2 of the return lever 30.

Conventionally, in normal operation, the handle lever 20, being articulated on the base 12, comprises an active part formed by the secondary arm 20.2, rotationally influencing the return lever 30, also articulated on the base 12, which itself will drive the movement of the lock and the unlocking of the door.

In order to transmit the rotation of the handle lever 20 to the return lever 30, the rotation shaft 32 of the return lever 30 in this example comprises a rod for longitudinal extension around the return axis X2 provided with a fin 34 projecting in radial extension intended to cooperate with a middle region 22 of the bottom face of the secondary arm 20.2 of the handle lever 20 in normal operation (FIG. 1). The fin 34 comprises for example a curvilinear profile for adapting to the middle region 22 of the secondary arm 20.2.

The lever or the return member 30 is preferably balanced. For this purpose, in this example, the center of gravity of the return member 30 is coincident with the rotation axis X2 thereof. Consequently, in the event of impact, the return member 30 does not move, which has the result of improving the safety of the opening control since there is no risk of causing unwanted unlocking of the lock following a movement of the return member 30 by inertia effect.

Figure 3:
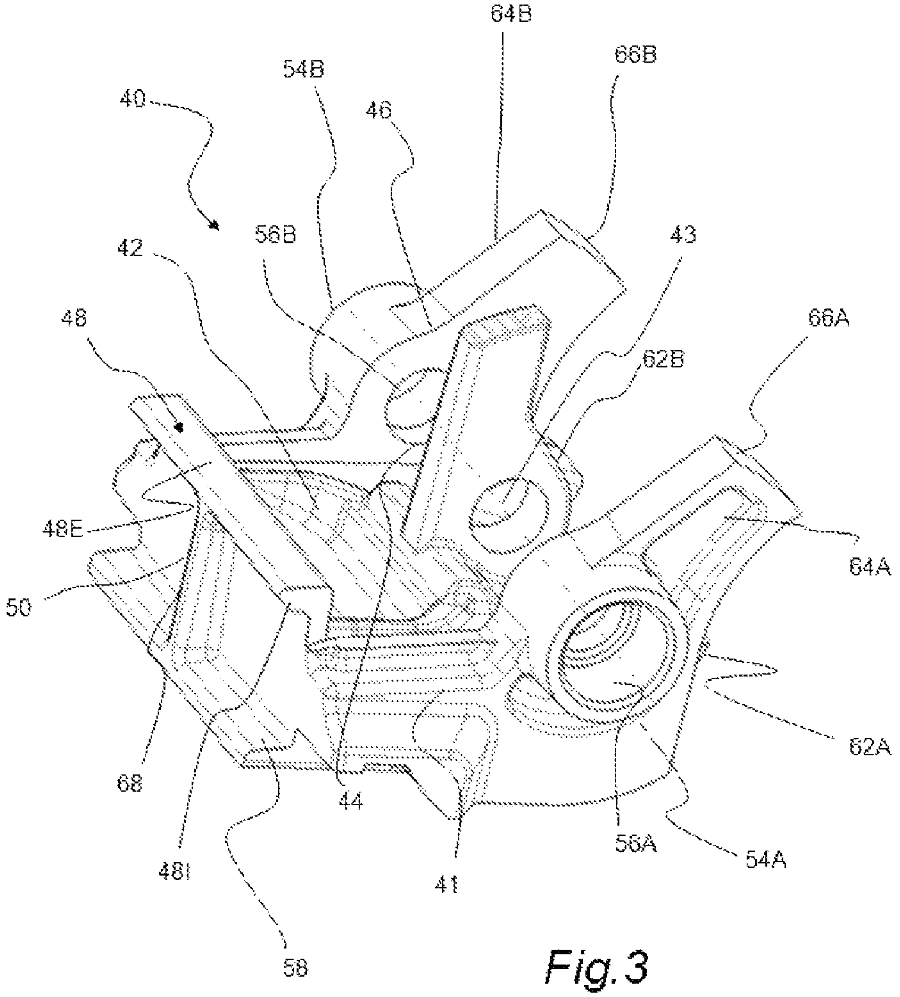
FIG. 3 shows a view in perspective of an inertial safety member of the device of FIG. 2.
Figure 4:
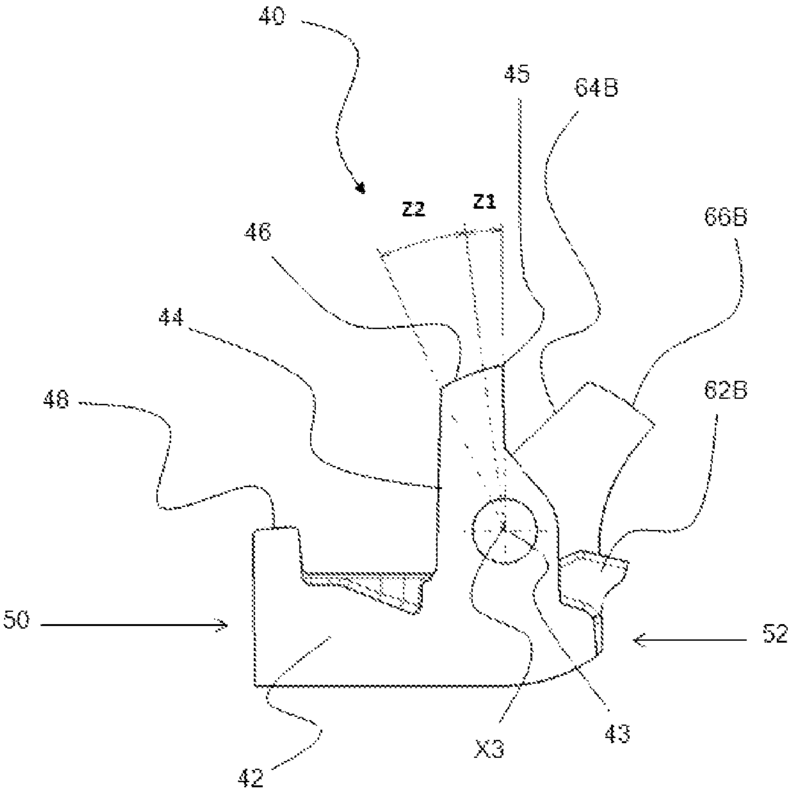
FIG. 4 shows a view in cross section of the inertial member of FIG. 3.

In accordance with the invention, the opening control 10 also comprises an inertial safety member 40 shown in FIGS. 1 and 2 and in more detail in FIGS. 3 and 4.

In general terms, this inertial safety member 40, hereinafter designated inertial member 40, is able to move between an inactive idle position (illustrated in FIGS. 1 and 12) wherein the inertial member 40 does not lock the kinematic chain 100 and an active position (illustrated in FIGS. 5 to 11) wherein the inertial member 40 locks the kinematic chain 100.

According to the first embodiment of the invention, as illustrated in detail in FIGS. 3 and 4, the inertial safety member 40 comprises a main body 42 forming an inertial mass and a locking element 44 connected to the body 42 and configured to pass, by inertia effect in the event of impact, from the inactive idle position to at least one active position of locking at least one movable element of the kinematic chain 100, here the secondary arm 20.2. Preferably, the inertial safety member 40 is formed in a single piece, for example in a material such as an alloy, for example Zamax, or by molding in a plastics material.

In this first embodiment, the safety member 40 is configured to lock the secondary arm 20.2 of the handle lever 20, the secondary arm 20.2 of the handle lever 20 forming a movable element of the kinematic chain 100. Naturally, in a variant of this first embodiment, the movable element of the chain 100 able to be locked by the inertial member 40 may be the return lever 40, as will be developed in detail hereinafter.

For this purpose, the safety member 40 is mounted so as to pivot about a third axis X3, hereinafter designated locking axis, fixed with respect to the support 12 between said inactive idle position and said active locking position.

Preferably, and in the example illustrated in FIG. 3, the body 42 of the safety member 40 comprises a frontal face 50 and a dorsal face 52 connected for example together by two lateral cheeks 54A, 54B. In the example illustrated, these two cheeks 54A, 54B are configured to transversely receive a rod pivoting on the axis X3, through openings formed 56A, 56B, forming for example rotation bearings.

In the active locking position, the locking element 44 is configured to be positioned on the path of the secondary arm 20.2 when the handle lever 20 pivots, so that said secondary arm 20.2 intercepts the locking element 44 to stop the rotation of the handle lever 20 and thus prevent opening of the door.

For this purpose, preferably, the locking element 44 is provided with an interception or locking surface 46 configured to intercept the movable element, here the secondary arm 20.2 of the handle lever 20, during the travel thereof in the event of impact. In the example illustrated, the locking element 44 extends radially from the locking axis X3, forming a finger provided at the end thereof with the stop surface 46.

In this first embodiment, the stop or interception surface 46 intercepts the secondary arm 20.2 by wedging or abutment effect of the inertial member 40, coming into engagement with a surface formed at the end of the secondary arm 20.2. The element 44 has in this example the form of a locking tooth or finger, for example substantially parallelepipedal, provided at the end of the interception surface 46.

More specifically, in accordance with the invention, the inertial member 40 is movably mounted so as to pivot on the base 12 about a locking axis X3 and is configured both to operate in a reversible mode by adopting at least one reversible locking position and also to operate in an irreversible mode by adopting at least one irreversible locking position.

Thus, in accordance with the invention, the inertial member 40 comprises a reversible operating mode, i.e., in this mode, the inertial member 40 occupies its locking position in a transient manner, so as to lock the kinematic chain 100 during the impact but to once again allow, within a short period following the triggering of the inertial safety member 40, the opening of the door.

For this purpose, as can be seen in FIG. 2, the inertial member 40 is equipped with an elastic member 60 that cooperates with the support 12 to elastically return the inertial member 40 to its inactive idle position, once the impact has passed. Thus the inertial member 40 is elastically returned to its idle position when the acceleration applied to the weight 42 formed by the body of the member 40 once again becomes zero. For this purpose, the inertial member 40 has for example on its bottom face a cutout 41 formed to come into abutment against a corresponding relief on the bottom of the support 12 (not shown).

Moreover, in order to avoid an insufficient effect of the locking of the inertial member 40 in the reversible mode, for example related to phenomena of offset bounces or variations in acceleration of the movable parts of the device 10 following the impact, the inertial member 40 also corresponds to an irreversible operating mode.

In this irreversible operating mode, the inertial member 40 remains in its locking position throughout the period of the impact and also after the impact even when the intensity of the inertial forces related to the impact once again become zero.

In particular, the reversible locking position is reached in a first range of pivoting of the inertial member 40 and the irreversible locking position is reached in a second range of pivoting of the inertial member 40.

More particularly, preferably, the stop surface 46 is configured for, in the event of impact, intercepting the movable element during its path in a first region Z1 of the stop surface 46 in the reversible mode and at least partially in a second region Z2 of the stop surface 46 in the irreversible mode, the first Z1 and second Z2 regions being defined as separate. In other words, the locking surface 46 of the inertial member 40 intercepts the movable element of the kinematic chain not in one and the same region but with a spatial offset. This spatial offset is caused in particular by different angular pivoting ranges of the inertial member 40 according to the reversible and irreversible modes and therefore an intersection of the paths of the inertial member and of the movable element at different locations and in different configurations.

This particularity of the invention is illustrated in detail in FIG. 4. In fact, as can be seen, the first region or zone Z1 is defined in relation to the first angular range of pivoting of the inertial member 40 and the second region or zone Z2 is defined in relation to the second angular range of pivoting of the inertial member 40. The relative positioning and sizing of the interception surface 46 of the inertial member 40 with respect to the secondary arm 20.2 are defined so that the interception surface 46 extends opposite an end front face of the secondary arm 20.2 at the time of an impact in order to come into engagement against each other, either upstream of the interception surface 46 on the first zone Z1 in the reversible mode, or more downstream of the interception surface 46 on the second zone Z2 in the irreversible mode, the terms "upstream" and "downstream" being defined in the direction of pivoting of the member 40.

In the example illustrated, in the irreversible mode, the locking element 44 intercepts the handle arm 20.2 at least partially on the region Z2 and also at least partially on the region Z1 of the locking surface 46. Optionally, in a variant that is not illustrated, the locking element 44 may intercept the secondary arm 20.2 by contact solely within the region Z2 and outside the region Z1.

Preferably, the stop surface 46 extends circumferentially substantially in an arc of a circle (or radius R) with respect to the locker axis X3. Preferably, the center of curvature of the arc is offset by an offset D with respect to the locker axis X3 in order to generate, in the case of pressing exerted on the stop surface 46 by the movable element, a rotary torque M of the inertial member 40 in the locking direction of this same member 40, as is visible in FIG. 6.

In particular, preferably, the change from the reversible mode to the irreversible mode is made by the inertial member 40, when it pivots in the event of an impact, passing without return a deformable tongue 70 mounted on the base 12. This tongue 70 is for example produced from metal material such as steel and is for example elastically deformable in flexion.

In the example described, in the irreversible mode, the inertial member 40 has pivoted in the second angular range following the passing of the tongue 70 so that it extends above the tongue 70, and in the reversible mode the inertial member 40 has pivoted in the first angular range under the tongue 70 without being able to pass it.

The tongue 70 is in particular illustrated in FIGS. 1 and 2. Preferably, the tongue 70 is configured to allow passing in a pivoting direction of the inertial member 40 and to prevent passing in the opposite direction. The tongue 70 comprises for example a metal blade, preferably produced from a stainless steel and configured to allow buckling along its longitudinal axis. This metal blade 70 is attached to the support by means of a screw 72 for example.

For this purpose, for example, the support 12 comprises a profiled member 74, for example formed in relief on the bottom of the support 12, forming a support sole plate 76 on which the tongue 70 is mounted, the tongue 70 rests partially on the sole plate 76 and is extended freely by an end so that the support sole plate 76 substantially opposes the bending thereof in one direction while allowing bending in the opposite direction by detachment of the tongue 70 from the support sole plate 76.

This makes it possible to form a rigid obstacle to the return of the safety member 40.

Furthermore, preferably, the spatial delimitation of the first Z1 and second Z2 zones of the contact surface 46 is defined by an angular separation imposed by a thickness of a lug 48 of the inertial member 40 that comes to be positioned on either side of the tongue 70.

In the example, the lug 48 comprises an interior rim of material 481 forming a positioning strut above the tongue 70 in the irreversible mode and for example an external positioning flat 48E, or a planar surface 48E, below the tongue 70 in the reversible mode. Thus the rim of material 481 imposes an angular offset in positioning of the inertial member 40 depending on whether the lug 48 is located below the tongue 70 or above and therefore consequently according to the reversible mode or the irreversible mode. This angular offset introduced by the lug 48 is represented, on the interception surface 46, by a spatial angular delimitation of the two regions Z1 and Z2.

Preferably, the main body 42 of the safety member 40 comprises a frontal attachment face 50 and an opposite dorsal face 52 extending substantially parallel to the locker axis X3, the frontal attachment face 50 comprises a top edge 48 in the form of an attachment rim forming the lug.

Furthermore, in the example described, the main body 42 of the safety member 40 comprises, on the frontal attachment face 50 thereof, also a bottom edge 58 forming an angular end-of-travel stop of the member 40 in the irreversible mode. This bottom edge 58 is intended to come into abutment against a stop shoulder 59 formed in the base 12.

In its nominal operating position (box "NO" in FIG. 11), the inertial member 40 does not intercept the movable element and the handle can pivot freely to allow opening of the door.

In its reversible locking position (box "RE" in FIG. 11), the inertial member 40 pivots under the effect of inertia and intercepts the movable element, here the secondary handle arm 20.2 inside the first zone Z1 of the contact surface 46 of the locking element 44.

In its irreversible locking position (box "IR" in FIG. 11), the inertial member 40 pivots under the effect of inertia and intercepts the movable element, here the secondary handle arm 20.2, at least partially in the second zone Z2 of the contact surface 46 of the locking element 44 and optionally also at least partially projecting into the first zone Z1.

In a variant not illustrated in FIGS. 1 to 12, the inertial member 40 can be configured to come to lock not the movable element formed by the secondary handle arm 20.2 but the return lever 30. In this case, and as provided for and illustrated in FIGS. 3 and 4, the inertial member 40 can have an extension of a lateral cheek 54A or 54B in the form of a locking finger 64A, 64B each having at the end a locking surface 66A, 66B. The operation can then be substantially identical to that described in relation to the locking element 44 with a locking surface 66 comprising separate regions Z1 and Z2, but will not be detailed any further below.

Preferably, the dorsal face 52 of the safety member 40 comprises a rocker foot 62 against which the secondary arm 20.2 comes to abut in order to urge the safety member 40 in a rocking movement during a normal opening operation of the handle lever 20. This rocker foot 62 in this example extends substantially orthogonally to the dorsal face 52. This makes it possible to avoid jamming of the inertial member 40 over the course of time, risking making it inoperative when an impact occurs on the vehicle.

Preferably, the inertial member 40 has a global symmetry of design along a midplane orthogonal to the locker axis X3. Advantageously, the safety member 40 is then able to be integrated indifferently in an opening control device 10 of a left-hand or right-hand door of the motor vehicle.

Thus, as illustrated in FIG. 3, the inertial member 40 has planar symmetry along a plane comprising the locking element 44 and orthogonal to the locker axis X3. FIG. 4 illustrates a view in cross section of the inertial member 40 along this symmetry plane.

In the example described, elements of the inertial member 40 are duplicated. This is the case in particular with the secondary locking element 66, the rocker foot 62, the lug 48 and the end-of-travel stop 58 (each divided into two parts by the rib 68) and the elastic member 60. In this FIG. 4 there can be seen in particular the left-hand rocker foot 62B, the left-hand secondary locking element 64B and the left-hand secondary locking surface 66B, the duplicated elements being referenced by the indicatory notation A or B in FIG. 3.

Preferably, the inertial member 40 also comprises a central rib 68 connecting together the rim 48 and the stop 58, this central rib 68 extending in said symmetry plane. The main locking element 44 preferably has bilateral operation and extends in the symmetry plane. Moreover, the main locking element 44 preferably has an orifice 43 suitable for receiving the pivoting rod 47 of the inertial member 44. In this case, the elastic member 60 comprises two springs 60A, 60B mounted on either side of the locking element 44 around said rod 47. These two springs 60A, 60B may be connected together or not for example.

FIGS. 13-18 show an opening control device according to a second embodiment. In this second embodiment, the elements similar to those described with reference to the first embodiment bear identical references. The secondary arm 20.2 is provided at its free end with a shape preventing the inertial member 40 from adopting the irreversible mode when the handle lever 20 is in the ejected position.

In order to meet ever more demanding safety requirements, the opening control device 10, in this second embodiment, makes provision for locking the kinematic chain 100 whatever the intensity of the impact in the case where the handle lever 20 is in its ejected position, for example when the vehicle is at rest.

For this purpose, the shape of the secondary arm 20.2 preferably defines at its end a profile in a step or in a nose 27 to delimit the first 25 and second 29 positioning notches configured to cooperate with the locking element 44 respectively in the flush position and in the ejected position of the handle lever 20. The step profile forms for example a projecting nose 27.

The second notch 29 is preferably provided with a surface 24 for circumferential contact with the interception surface 46 of the inertial member 40, preferably in the region Z2, and with a radial stop surface 28 locking the rotation of the inertial member 40 in the reversible mode. Furthermore, in this example, the first notch 25 has a surface 26 for circumferential abutment with the interception surface 46 of the inertial member 40, preferably in the region Z1.

In the second embodiment, the safety member 40 is identical to the first embodiment as illustrated in FIGS. 3 and 4. The safety member 40 comprises at least one secondary locking element 64, here two secondary locking elements 64A, 64B, the main locking element 44 cooperating with the secondary arm 20.2 and the secondary locking element 64 cooperating with the return member 30. The two main 44 and secondary 64 locking elements are preferably spaced apart angularly from each other, in order to be positioned simultaneously face to face respectively with an end face of the secondary arm 20.2 and a face of the return lever 30. The advantage of this arrangement is to provide more secure locking of the kinematic chain of the opening control 10.

A description will now be given of the main operating aspects of an opening control device according to the two embodiments described above with reference to FIGS. 1 to 12 on the one hand and to FIGS. 13 to 18 on the other hand.

In the first embodiment illustrated with reference to FIGS. 1 to 12, in normal idle configuration illustrated in FIG. 1, the inertial member 40 does not lock the movement of the handle lever 20 with respect to pivoting. The inertial member 40 is in an idle position. Furthermore, the handle lever is in a level position, also referred to as flush.

Figure 12:
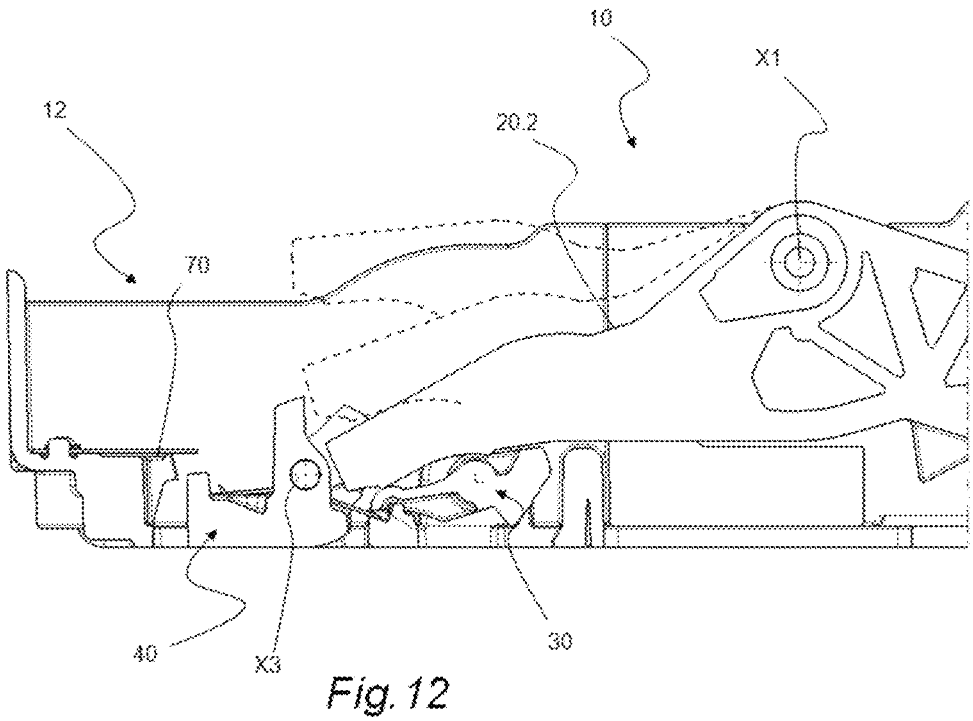
FIG. 12 shows a view in cross section of the handle lever illustrating a normal operating mode of the opening control device.
Figure 13:
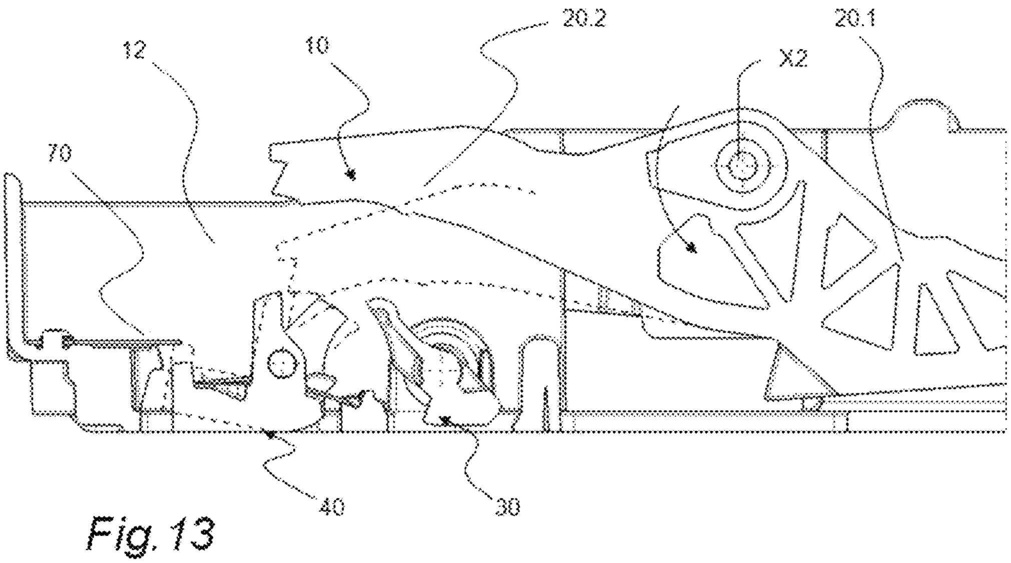
FIG. 13 shows a view in cross section of the opening control device according to a second embodiment of the invention when the handle lever is initially in a flush position in a reversible operating mode following an impact.
Figure 14:
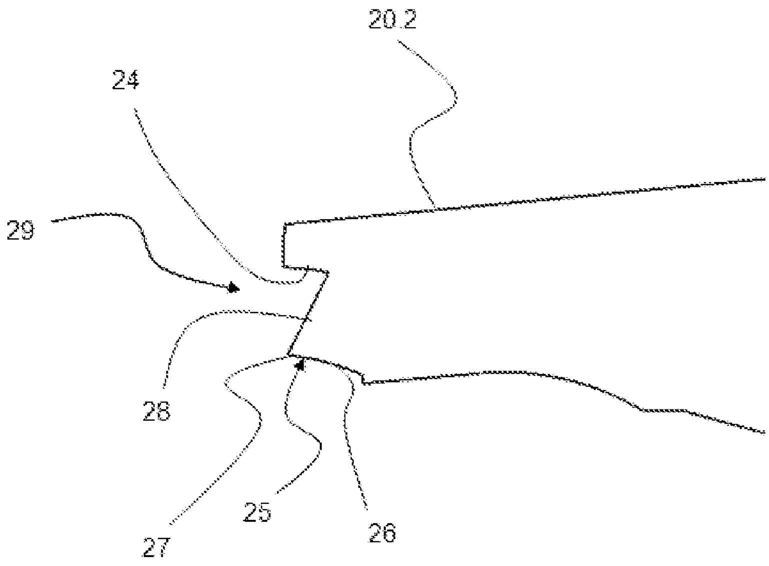
FIG. 14 shows a detailed view in cross section of a portion of an active arm of the handle lever of the device illustrated in FIG. 13.

When a user pivots the handle lever 20 in normal operation illustrated in FIG. 12, the inertial member 40 is maintained in its idle position by its elastic return member 60 and the end surface of the handle lever 20 of the secondary arm 20.2 does not intercept the interception surface 46 of the inertial member 40. However, preferably, the secondary arm 20.2 urges the inertial member 40 in an angular low-amplitude rocking by means of the rocker foot 62 of this inertial member 40. Moreover, the internal median surface 22 of the handle lever 20 comes into engagement with the radial fin 34 of the return member 30, pivoting the latter until unlocking of the lock is caused, in this case by traction of the keeper wire or of a linkage known per se.

Figure 5:
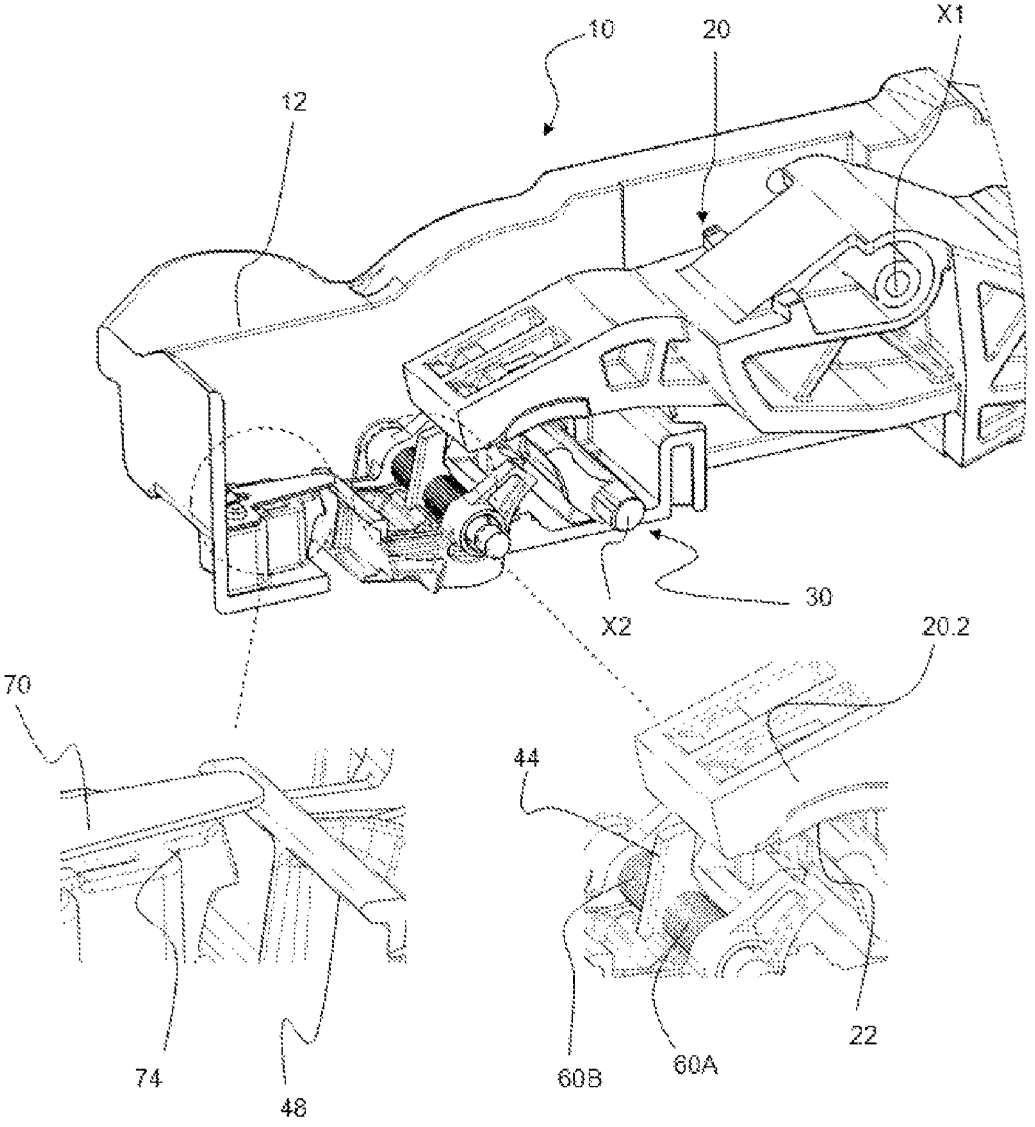
FIG. 5 shows a view in exploded cut-away perspective of the device in a reversible operating mode.
Figure 6:
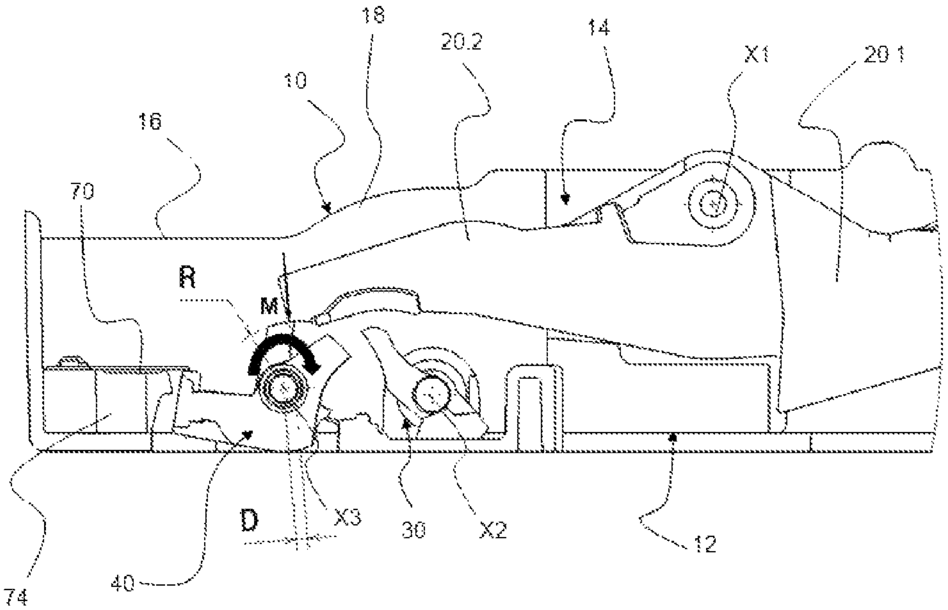
FIG. 6 shows a view in cross section of the device of FIG. 5.
Figure 7:
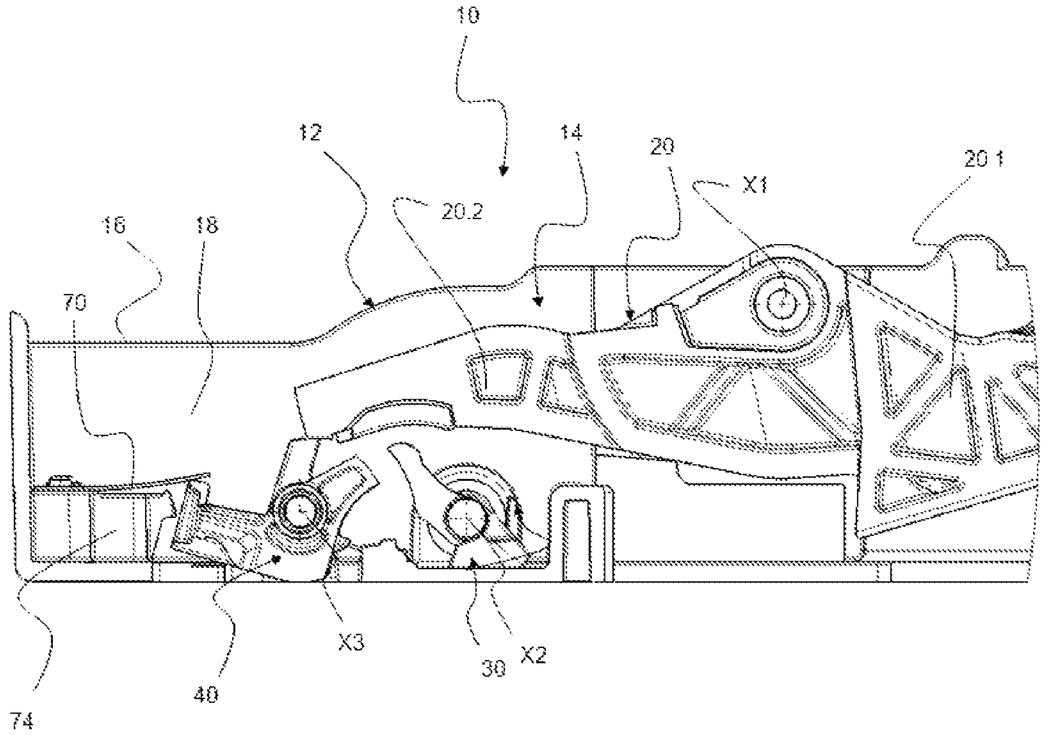
FIG. 7 shows a view in cross section of the control device of FIG. 1 in a longitudinal direction illustrating a first state of the irreversible operating mode.
Figure 8:
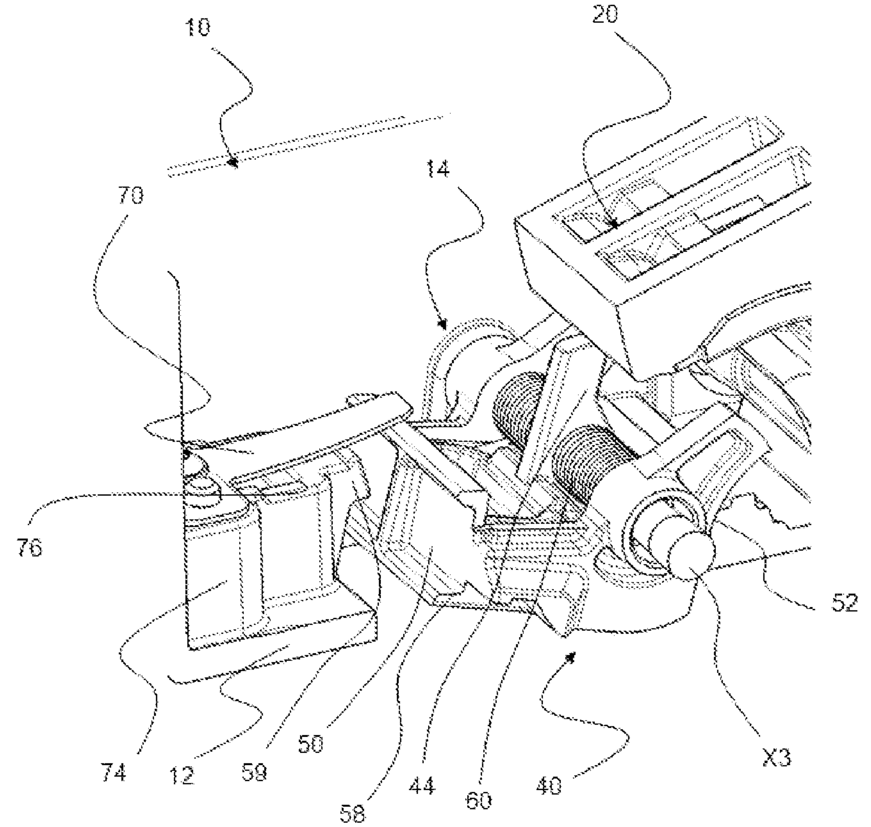
FIG. 8 shows a partial view in perspective to an enlarged scale of FIG. 7.
Figure 9:
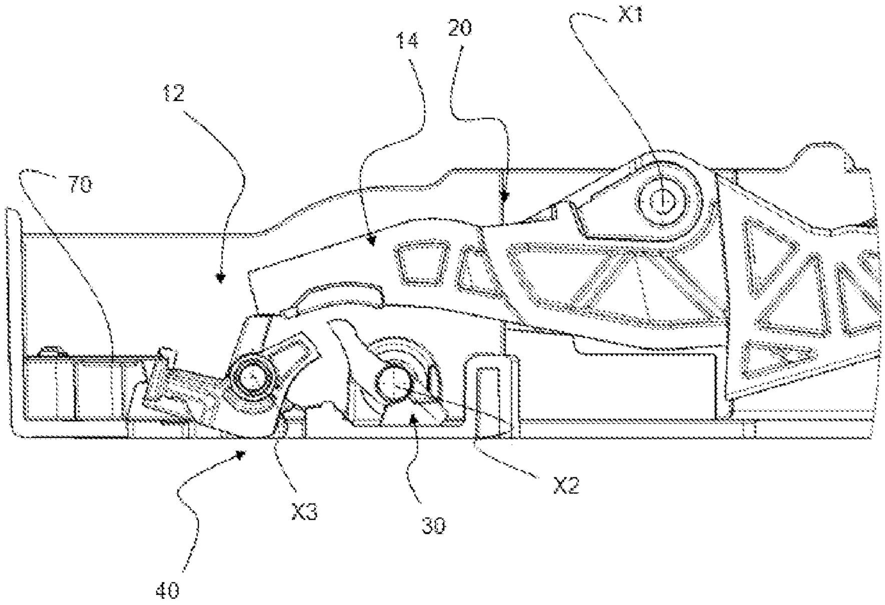
FIG. 9 shows a view in cross section of the control device of FIG. 1 in a longitudinal direction illustrating a second state of the irreversible operating mode.
Figure 10:
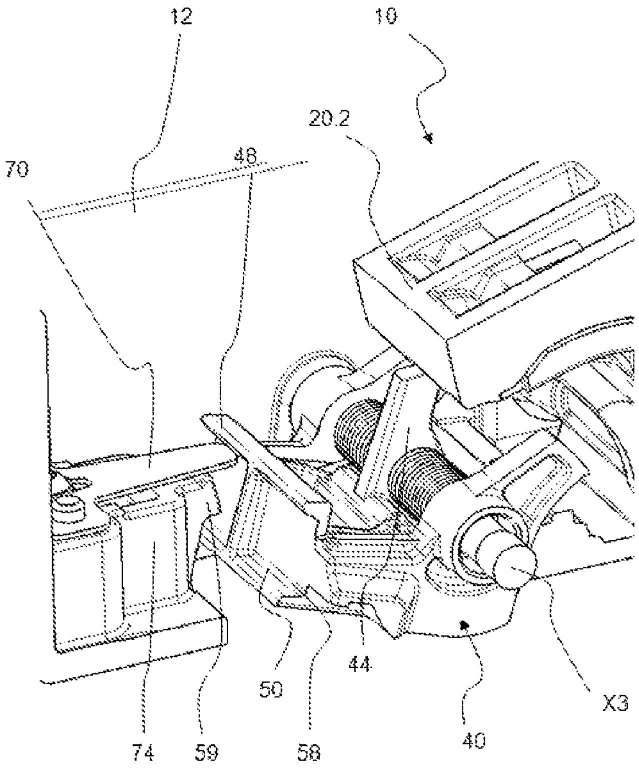
FIG. 10 shows a partial view of FIG. 9 in perspective to an enlarged scale.
Figure 11:
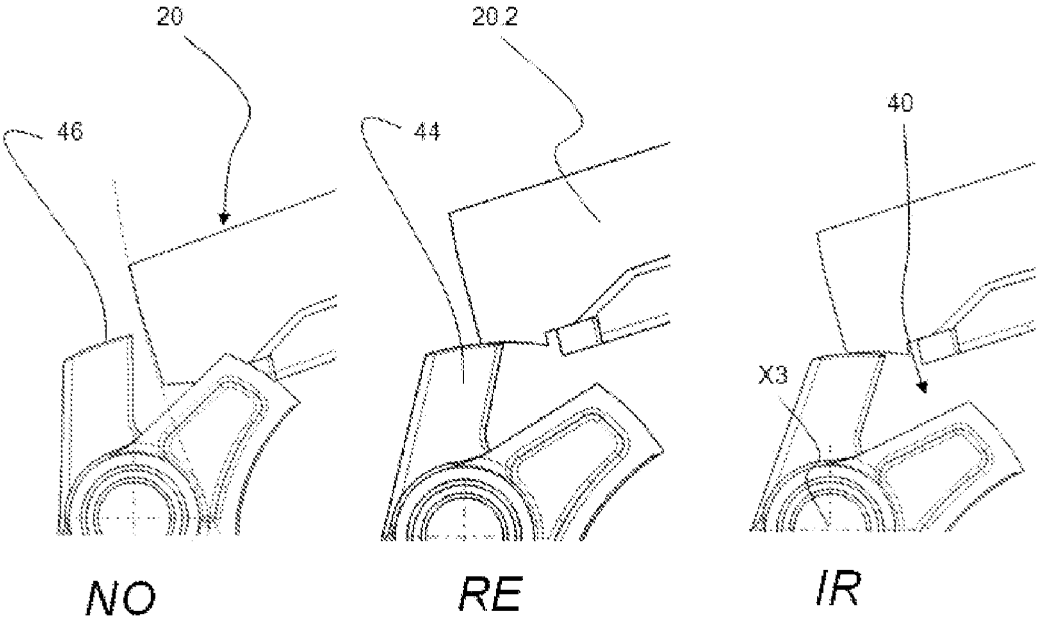
FIG. 11 shows a view in cross section of a part in three successive operating states in normal, reversible and irreversible operating modes.

During an impact of low to medium amplitude, as illustrated in FIGS. 5 and 6, the inertial member 40 is rotated by its inertia movement counter to the return force of its elastic member 60 within the first angular pivoting range. As the acceleration suffered is of low to medium intensity, the inertial member 40 comes to abut, with its lug flat 48E, under the tongue 70 without having sufficient inertia for passing the tongue 70 and passing over the latter. In pivoting, the inertial member 40 and more particularly the interception surface 46 thereof comes to be positioned on the movement path of the end of the secondary arm 20.2 and comes into engagement with an end surface of this arm, within the limit of the region Z1 of the interception surface 46.

This prevents the complete pivoting of the handle lever 20 and the actuation of the opening control 10.

At the time of an impact of high amplitude, beyond a predefined threshold, as illustrated in FIGS. 7 to 10, the inertial member 40 has sufficient inertia to pivot until it passes the tongue 70 and reaches the second pivoting range. Preferably, the end-of-travel stop 58 comes into abutment against a relief 59 on the base 12 to limit the angular pivoting amplitude of the inertial member 40. As the tongue 70 is configured to block the passing of the inertial member 40 in the opposite direction, the inertial member 40 is maintained in the irreversible operation mode.

In this irreversible operation mode, the interception surface 46 comes into engagement with the end surface of the secondary arm 20.2, on the zone Z2 of the interception surface.

In the second embodiment illustrated with reference to FIGS. 15 and 16, when the handle lever 20 is in a flush initial position, i.e. retracted inside the base 12, the operation of the opening control 10 is similar to that already described previously with reference to the first embodiment of the invention.

Figure 15:
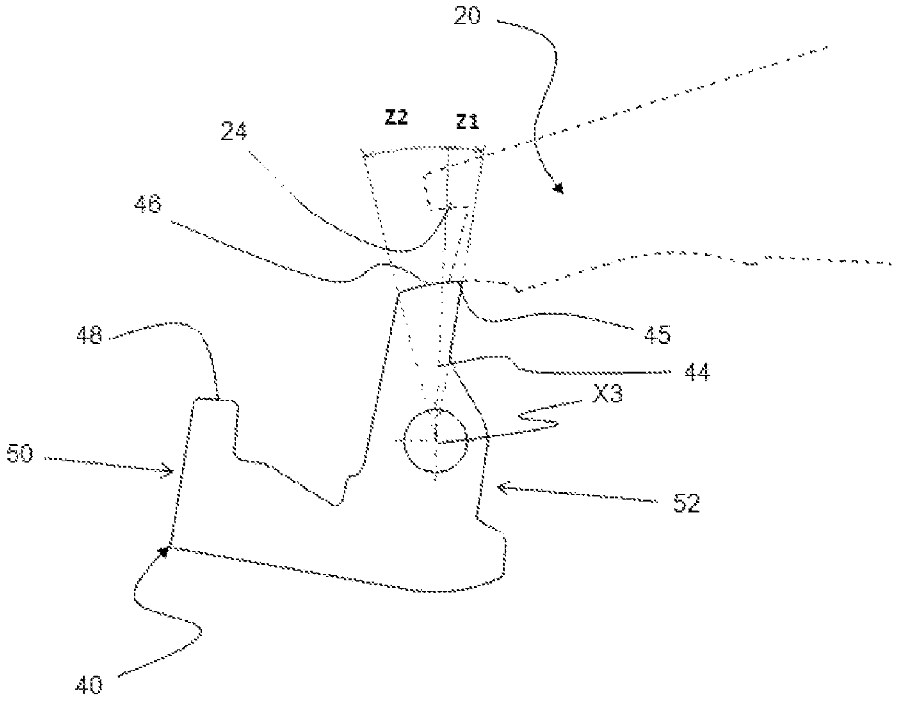
FIG. 15 shows a view in cross section to an enlarged scale of the inertial member and of the active arm of the handle lever of FIG. 13.

Thus, in a case of low intensity of impact corresponding to the illustration in FIG. 15, the locking element 44 intercepts, in the first region Z1 of the interception surface 46, the secondary arm 20.2. In the example of this second embodiment, the locking element 44 cooperates with the first notch 25 of the secondary arm 20.2. In the example described, the interception surface 46 cooperates with the circumferential surface 26 of the first notch 25 with the first region Z1 of the surface 46.

Figure 16:
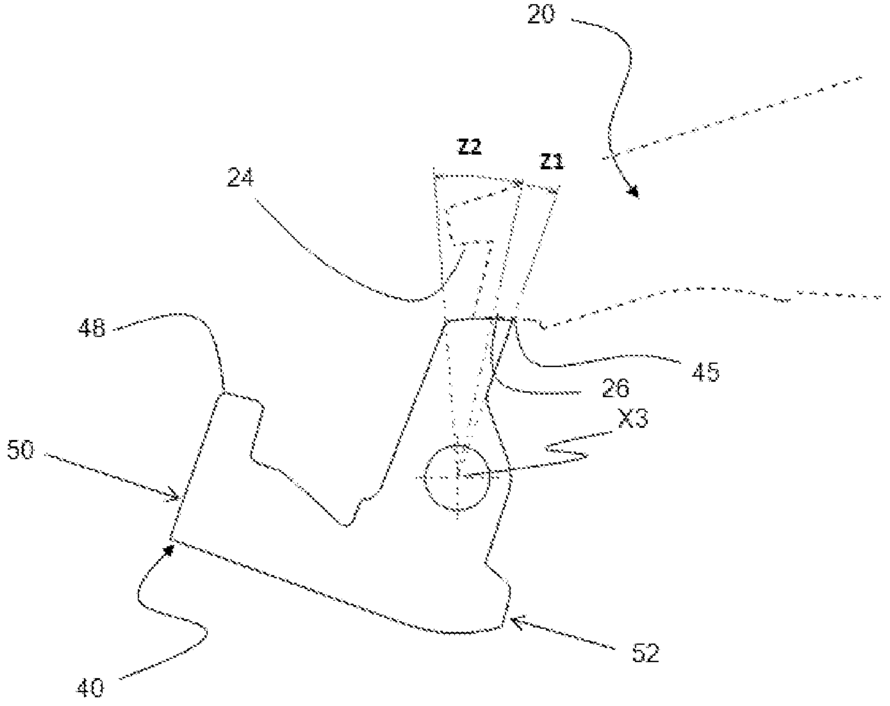
FIG. 16 shows a view in cross section to an enlarged scale of the inertial member and of the active arm of the handle lever of the control device according to the second embodiment in an irreversible mode following an impact.

Moreover, in a case of higher intensity of impact corresponding to the illustration in FIG. 16, the locking element 44 intercepts the movable element 20.2, still with the first notch 25, at least partially in the second region Z2 of its interception surface 46, located further downstream than the first region Z1.

Figure 17:
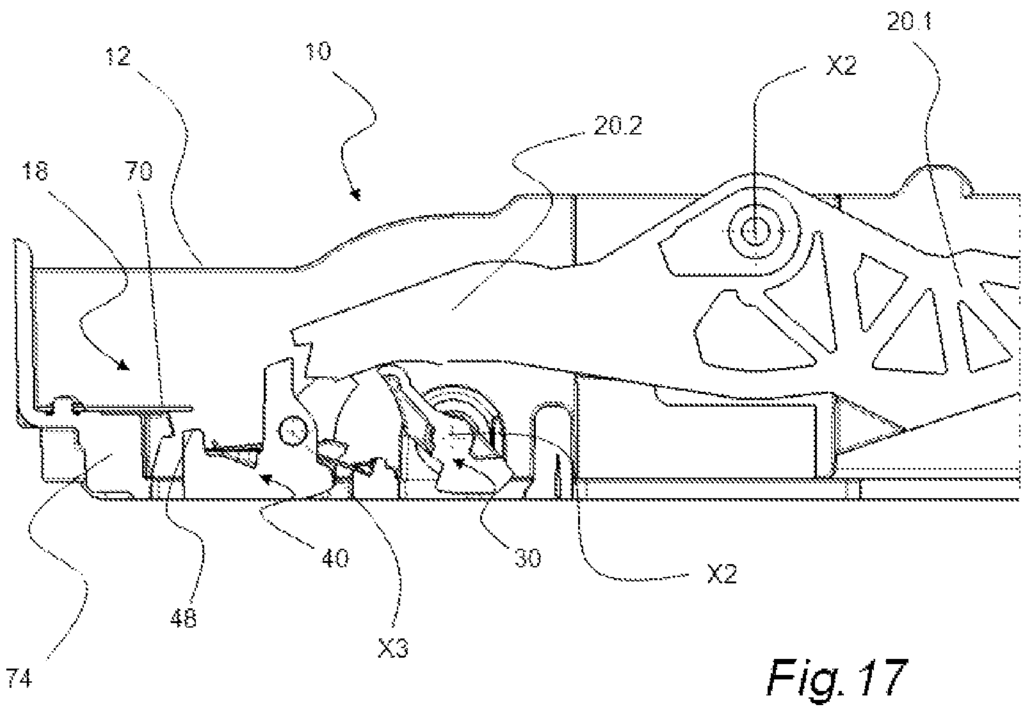
FIG. 17 shows a view in cross section of the device illustrated in FIG. 13 when the handle lever is initially in an ejected position and in a normal operating mode.
Figure 18:
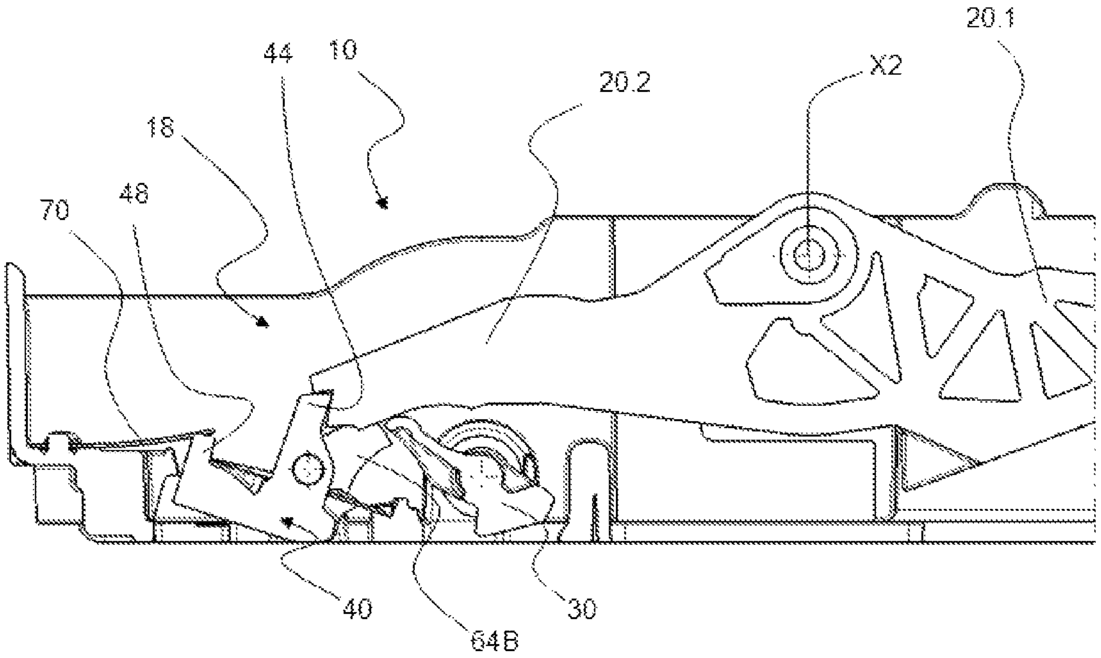
FIG. 18 shows a view in cross section of the device illustrated in FIG. 17 in a reversible operating mode.

On the other hand, the operation is substantially different when the handle lever 20 is in an ejected initial position, as may occur in certain situations, in particular when the vehicle is at rest. This is illustrated in FIGS. 17 and 18.

In this case, preferably, the inertial member 40 operates solely in reversible mode, and this whatever the intensity of the impact.

In the ejected position, the secondary arm 20.2 of the handle lever 20 is closer to the return lever 30, so that an unwanted movement of the handle lever 20 following an impact may cause the driving in movement of the return member 30. In order to avoid this movable concatenation that may lead to the unlocking of the opening control 10, the secondary arm 20.2 has a shape at the end provided with a radial stop surface 28 configured to come into engagement with a radial surface of the locking element 44 of the inertial member 40 and a circumferential contact surface 24. As described previously, this circumferential surface 24 and this radial stop surface 28 delimit together the second notch 29. The locking element 44 then comes to be embedded, for example, with its wedge-shaped ridge 45, inside the hollow relief delimited by the projecting nose 27 of the free end of the secondary arm 20.2 of the handle lever 20, in the second notch 29, as illustrated in FIGS. 17 and 18. In this second embodiment, the inertial member 40 radially intercepts the movable element without involving the tongue 70.

Furthermore, in the example described, the secondary locking element 64 comes to be interposed on the path of the return lever 30, also locking the movement of the latter.

The invention is not limited to the embodiments described above. Other embodiments within the capability of a person skilled in the art can also be envisaged without departing from the scope of the invention defined by the following claims. Thus, in particular, modifying the detailed forms of the handle or of the active arm thereof or of the inertial member would not be departing from the scope of the invention.

The invention claimed is:

1. A device for controlling the opening of a motor vehicle door, comprising:
- a base,
- a handle lever configured for being mounted so as to pivot on the base about a first axis,
- a kinematic chain configured for transmitting a movement of the handle lever to unlock the door,
- an inertial safety member formed in a single unitary piece forming an inertial mass and configured to pass, by inertia effect in the event of impact, from an inactive position to at least one active position in which at least one movable element of the kinematic chain is locked,
- wherein the single unitary piece is mounted so as to be able to move pivotably on the base about a second axis and is configured for operating in a reversible mode by adopting at least one reversible locking position in a first angular pivoting range and for operating in an irreversible mode by adopting at least one irreversible locking position in a second angular pivoting amplitude range.

2. The device according to claim 1, wherein the single unitary piece comprises a main body and a main locking element connected to the main body, and wherein the main locking element is provided with a locking surface configured for, in the event of impact, intercepting the movable element during the travel thereof within the limit of a first region of the locking surface in the reversible mode and at least partially in a second region of the locking surface in the irreversible mode, separate from the first region.

3. The device according to claim 1, wherein the passage from the reversible mode to the irreversible mode is implemented by passing, without return by the single unitary piece, during pivoting thereof in the event of impact, a tongue, elastically deformable under bending, mounted on the base.

4. The device according to claim 1, wherein the movable element comprises a secondary arm of the handle lever or a return member mounted so as to be able to pivot with respect to the base about a third axis.

5. The device according to claim 4, wherein, the handle lever is able to adopt a flush position wherein the handle lever is completely or partially housed in the base and an ejected position wherein the handle lever extends at least partly out of the base, the secondary arm is provided at its free end with a shape preventing the single unitary piece from adopting the irreversible mode when the handle lever is initially in the ejected position.

6. The device according to claim 5, wherein the single unitary piece comprises a main body and a main locking element connected to the main body and wherein said shape of the secondary arm defines a profile with a locking nose delimiting first and second positioning notches configured for cooperating respectively in the flush position with a locking surface of the main locking element and in the ejected position with at least one wedge-shaped ridge of the main locking element.

7. The device according to claim 6, wherein the second notch is provided with a radial stop surface locking the rotation of the single unitary piece.

8. The device according to claim 1, wherein the single unitary piece comprises a main body, a main locking element connected to the main body and at least one secondary locking element, the main locking element cooperating with a secondary arm of the handle lever and the secondary locking element cooperating with a return member mounted so as to be able to pivot with respect to the base about a third axis, the main locking element and the secondary locking element, being spaced apart angularly from each other.

9. The device according to claim 2, wherein the spatial delimitation of the first and second regions of the locking surface corresponds to an angular offset caused by a positioning lug of the single unitary piece on either side of a tongue, elastically deformable under bending, mounted on the base.

10. The device according to claim 9, wherein the lug comprises an internal rim of material forming a positioning strut above the tongue in the irreversible mode and an exterior positioning flat below the tongue in the reversible mode.

11. The device according to claim 1, wherein the single unitary piece comprises a main body that comprises a frontal attachment face and an opposite dorsal face extending substantially parallel to the second axis, the frontal attachment face comprises an upper edge in the form of an attachment rim.

12. The device according to claim 1, wherein the single unitary piece comprises a main body that comprises a frontal attachment face and an opposite dorsal face extending substantially parallel to the second axis, the frontal face also comprises a bottom edge forming an angular end-of-travel stop of the single unitary piece in the irreversible mode.

13. The device according to claim 3, wherein the tongue is configured to allow passing of the single unitary piece in a pivoting direction and to prevent passing in the opposite direction.

14. The device according to claim 13, wherein the base comprises a profiled member forming a support sole plate on which the tongue is mounted, the tongue rests partially on the sole plate and is extended freely by one end so that the support sole plate substantially opposes the bending thereof in one direction while allowing bending in the opposite direction by detachment of the tongue from the support sole plate.

15. The device according to claim 2, wherein the locking surface circumferentially extends substantially in an arc of a circle, the center of curvature of the arc being offset with respect to the second axis in order to generate, in the event of pressing exerted on the locking surface by the movable element, a rotational torque of the single unitary piece in the direction of locking of the single unitary piece.

16. The device according to claim 1, wherein the single unitary piece has global symmetry of design along a mid-plane orthogonal to the second axis.

17. The device according to claim 4, wherein a face of the single unitary piece comprises a rocker foot, against which the secondary arm comes to abut to urge the single unitary piece in a rocking movement during a normal opening operation of the handle lever.

18. The device according to claim 2, wherein the main locking element extends radially from the second axis, forming a finger provided at the end thereof with said locking surface.

19. The device according to claim 1, wherein the handle lever comprises a main gripping arm and a secondary arm extending the main arm each located on either side of the first axis, said kinematic chain comprising at least one active arm of the handle lever formed by the secondary arm.

* * * * *